United States Patent Office 3,223,552
Patented Dec. 14, 1965

3,223,552
METHOD FOR PRODUCING THIN
TITANO-CERAMIC FILM
Shigeki Sakurai, Shijio Watabe, and Atsuo Morio, Tokyo, Japan, assignors to Nippon Telegraph & Telephone Public Corporation, Tokyo, Japan, a corporation of Japan
Filed Jan. 11, 1961, Ser. No. 102,329
Claims priority, application Japan, Jan. 14, 1960, 35/824;
June 30, 1960, 35/29,577
11 Claims. (Cl. 117—200)

This invention relates to the production of thin titano-ceramic films for use for example in ceramic capacitors and as semi-conductors.

Two methods for producing titano-ceramics are known, namely (a) a method in which a mixture of powders of metal oxides, chlorides, nitrates, carbonates and the like, with titanium oxide as the main component, is burned to form a desired shape; and (b) the method in which the above-mentioned mixture, using the finest powders, is glazed on to a platinum plate by causing the mixture to vaporize and be deposited upon the platinum plate and subsequently heating the coated plate to a high temperature. The minimum thickness of the thin film which could be obtained industrially by employing the first of these methods was not less than 60μ. In the second method the platinum plate is indispensable to the glazing step, and a temperature of more than 1300° C. is required for the burning and although the substances used in carrying out the method were grains with a diameter of about 1μ, it was found that pin holes were liable to be formed on the surface of the glazed film.

It is the object of the present invention to provide an improved process for the production of titano-ceramics which is free from the drawbacks of the known processes in that very much thinner films are obtainable and the risk of pin-holes appearing in the films is very much reduced.

According to the present invention vapors of one or more metals or metallic salts, or both, and vapors of an organic titanium compound are introduced into an evacuated chamber, or a chamber containing an inert or a reducing gas. Within the chamber is disposed a ceramic substrate or a base of a metal such as titanium or molybdenum. The temperature within the chamber is so high as to cause a reaction to occur between the components of the vaporized mixture and the resultant reaction product deposits upon the base or substrate.

When carrying out the invention to place upon the substrate a thin titano-ceramic film similar to a solid solution of barium titanate, oxidized titanium and oxidized magnesium, the organic titanium compound may, for example, be a cyclopentadiene compound of titanium alkoxide or titanium phenylate. The mixture in the chamber may also contain vapors from one or more of the following: barium, barium naphthenate, cadmium ricinoleate, and magnesium phenylate. Typically, the reaction between the components of the mixture occurs at a temperature of about 1000° C.

Figure 1:
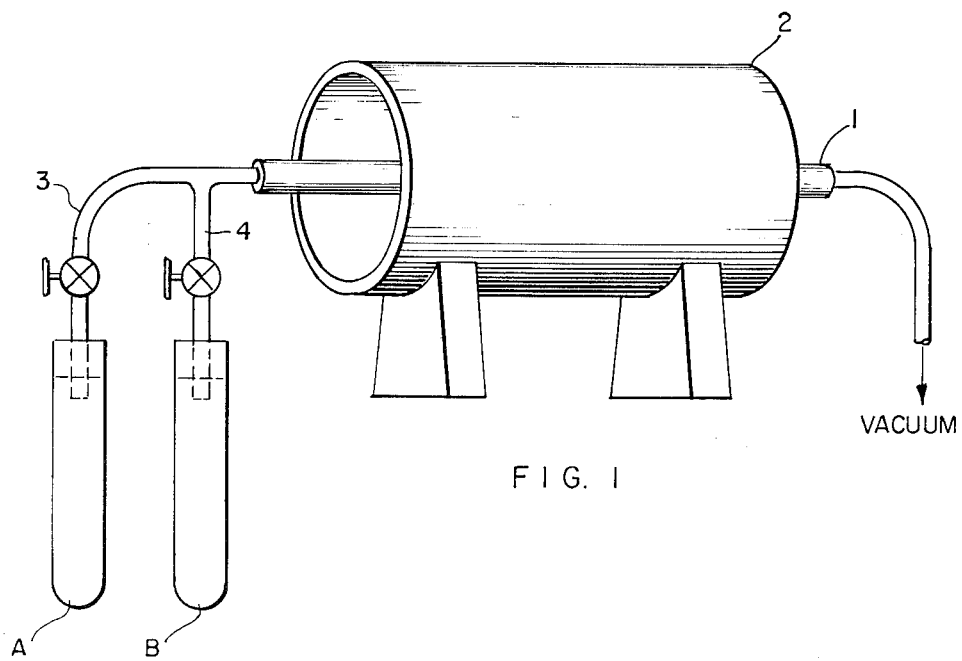
Figure 2:
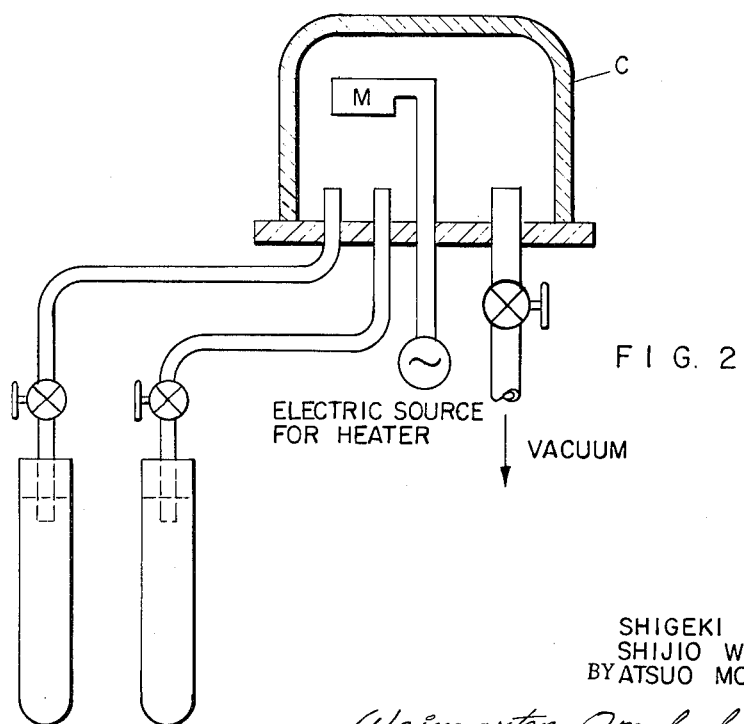

The invention will now be described with reference to the following specific examples, and with reference also to the two figures of the accompanying drawings in which, FIGS. 1 and 2 schematically depict apparatus employed in performing the invention.

Example 1

In FIG. 1 of the drawing A and B are containers connected by independently controlled outlets 3 and 4, to a quartz pipe 1 that extends through an electric furnace 2. Containers A and B can be heated, by means not shown, to different temperatures. A titanium plate, utilized as a substrate or base, is placed in the middle of the quartz pipe so as to be located at the center of the electric furnace. Container A is charged with tetraethyl titanate and container B is charged with barium ricinoleate. Pressure within the quartz pipe 1 is reduced to 1 mm. Hg by means of a vacuum pump (not shown) and then the container A is heated to 60° C. and container B is heated to 150° C. The vapour from the two containers is fed into the quartz pipe 1, with the electric furnace maintained at 1000° C. The mixed vapours decompose and a thin film of barium titanate is formed on the titanium plate in the quartz pipe 1.

Example 2

To the apparatus shown in FIG. 1, an additional container is installed which is charged with zirconium tetrabutoxide. The process is carried out as in Example 1, with the additional container C heated to 100° C. A thin coating or film having a high dielectric constant is produced upon the surface of the titanium substrate.

Example 3

In the apparatus shown in FIG. 1, container B is charged with magnesium-phenylate instead of barium ricinoleate, and the process is carried out as described in Example 1 with the container B heated to 100° C. A thin film of a solid solution of titanium oxide with small temperature co-efficient and oxidised magnesium is formed upon the surface of the titanium plate in the quartz pipe 1.

Example 4

In the apparatus shown in FIG. 1, barium is used in container B instead of barium ricinoleate, and the process is carried out as described in Exampel 1 with the container B heated to about 800° C. by means of an electric heater. A thin film having a high dielectric constant is obtained.

Example 5

In the apparatus shown in FIG. 1, container A is closed with $Ti[N(C_6H_5)_2]_4$ and heated to 600° C., whilst container B is charged with barium hydroxide and heated to 50° C., the mixture of vapours from the two containers being led to the quartz pipe 1, which is maintained at 1,000° C. As thermal decomposition takes place, a thin film of barium titanate is built up on the surface of the titanium base plate.

Example 6

In FIG. 2 of the drawing the interior of the chamber C is brought to a vacuum condition of $10^{-5}$ mm. Hg. Chamber A is charged with titanium tetrapropoxide and heated up to 40° C., and the mixture of vapours produced from A and B is led into the chamber C where it is blown against the molybdenum wire M as a base, this base being heated to 1,000° C., within the chamber C. The mixed vapours decompose and a thin ceramic film of a solid solution of silicon oxide and titanium oxide with low temperature co-efficient is built around the molybdenum wire M.

As explained above, as the test substance is used in a vaporised condition a thin film with very few pin holes can be obtained, at the heating temperature of 1,000° C.

The thin ceramic film obtained in this way may be employed in small-sized capacitors, memory parametron, semiconductor devices, dielectric amplifiers and so on.

In a modification of the process according to the invention, a thin film itself can be obtained as it will separate from the substrate if the materials are cooled suddenly from the thermal decomposition temperature.

What we claim is:

1. A method for producing a titano-ceramic film comprising the steps
   (1) forming a vaporized mixture of an (a) organic titanium compound selected from the group consisting of a titanium cyclopentadiene, titanium phenylate, tetraethyl titanate, and Ti[N(C$_6$H$_5$)$_2$]$_4$, and (b) a material selected from the group consisting of barium, barium hydroxide, barium naphthenate, barium ricinoleate, cadmium ricinoleate, magnesium phenylate (2) heating the vaporized mixture to a temperature sufficiently high to cause the organic compound to decompose; and (3) providing a substrate upon which is deposited from the decomposed mixture a thin titano-ceramic film.

2. The method according to claim 1, further including the step of rapidly cooling the deposited film and substrate to cause the film to separate from the substrate.

3. The method according to claim 1, further including the step of introducing a vapor of zirconium tetrabutoxide into the aforesaid vaporized mixture.

4. The method according to claim 1 wherein the substrate is located in an evacuated chamber into which the vapor mixture is introduced.

5. The method according to claim 1 wherein steps (2) and (3) are carried out in a chamber containing an atmosphere of an inert gas.

6. The method according to claim 1 wherein steps (2) and (3) are carried out in a chamber having a reducing atmosphere.

7. A method for producing a titano-ceramic film comprising the steps (1) forming a vaporized mixture of an (a) organic titanium compound selected from the group consisting of a titanium cyclopentadiene, titanium phenylate, tetraethyl titanate, and Ti[N(C$_6$H$_5$)$_2$]$_4$, and (b) a material selected from the group consisting of barium, barium hydroxide, barium naphthenate, barium ricinoleate, cadmium ricinoleate, magnesium phenylate (2) heating the vaporized mixture in a chamber maintained at a temperature of about 1,000° C. to cause the organic compound to decompose, and (3) providing a substrate in the chamber upon which is deposited from the decomposed mixture a titano-ceramic film, the substrate being a material selected from the group consisting of molybdenum, titanium, and ceramic.

8. A method for producing a titano-ceramic film comprising the steps of (1) providing a substrate in an evacuated chamber, (2) forming a vapor of tetraethyl titanate, (3) forming a vapor of barium ricinoleate, (4) introducing the vapors into the evacuated chamber, and (5) heating the vaporized mixture to a temperature of about 1,000° C. to cause a film of barium titanate to be produced upon the substrate.

9. A method for producing a titano-ceramic film, comprising the steps of (1) providing a titanium substrate in an evacuated chamber, (2) heating a charge of tetraethyl titanate to produce a vapor, (3) heating a charge of barium ricinoleate to produce a vapor, (4) heating a charge of zirconium tetrabutoxide to produce a vapor, (5) introducing the vapors into the evacuated chamber, and (6) maintaining the chamber at a temperature of about 1,000° C. to cause a thin titano-ceramic film to form upon the surface of the substrate.

10. A method for producing a titano-ceramic film, comprising the steps of (1) providing a titanium substrate in an evacuated chamber, (2) heating a charge of tetraethyl titanate to a temperature of about 60° C. to produce a vapor, (3) heating a charge of magnesium phenylate to a temperature of about 100° C. to produce a vapor, (4) introducing the vapors into the evacuated chamber, and (5) maintaining the chamber at a temperature of about 1,000° C. to cause a film of a solid solution of oxides of titanium and magnesium to be formed upon the substrate.

11. A method for producing a titano-ceramic film, comprising the steps of (1) providing a substrate of titanium in an evacuated chamber, (2) producing a vapor of barium, (3) producing a vapor of tetraethyl titanate, (4) introducing the vapors into the evacuated chamber, and (5) maintaining the chamber at a temperature of about 1,000° C. to cause a titano-ceramic film to be formed upon the surface of the substrate.

References Cited by the Examiner

UNITED STATES PATENTS

| 2,405,662 | 8/1946 | McManus et al. | 117—107 |
| 2,922,730 | 1/1960 | Feldman | 117—106 |
| 2,941,903 | 6/1960 | Winston | 117—106 |
| 3,052,949 | 9/1962 | Williams et al. | 106—41 |

FOREIGN PATENTS

| 969,552 | 6/1958 | Germany. |
| 1,082,474 | 5/1960 | Germany. |

RICHARD D. NEVIUS, *Primary Examiner.*